(12) United States Patent
Pekny et al.

(10) Patent No.: US 8,429,329 B2
(45) Date of Patent: Apr. 23, 2013

(54) SERIAL INTERFACE NAND

(75) Inventors: Theodore T. Pekny, Sunnyvale, CA (US); Jeff Yu, Fremont, CA (US)

(73) Assignee: Micron Technology, Inc., Boise, ID (US)

(*) Notice: Subject to any disclaimer, the term of this patent is extended or adjusted under 35 U.S.C. 154(b) by 967 days.

(21) Appl. No.: 11/873,816

(22) Filed: Oct. 17, 2007

(65) Prior Publication Data

US 2009/0103364 A1 Apr. 23, 2009

(51) Int. Cl.
*G06F 12/02* (2006.01)
(52) U.S. Cl.
USPC .............................. 711/103; 711/118
(58) Field of Classification Search .......... 711/118, 711/115, 165, 103
See application file for complete search history.

(56) References Cited

U.S. PATENT DOCUMENTS

| | | | |
|---|---|---|---|
| 5,907,856 A * | 5/1999 | Estakhri et al. | 711/103 |
| 6,418,506 B1 * | 7/2002 | Pashley et al. | 711/103 |
| 6,434,648 B1 * | 8/2002 | Assour et al. | 710/305 |
| 6,732,221 B2 * | 5/2004 | Ban | 711/103 |
| 6,965,963 B1 | 11/2005 | Nakanishi et al. | |
| 7,093,071 B2 | 8/2006 | Rudelic | |
| 7,447,950 B2 * | 11/2008 | Takahashi et al. | 714/702 |
| 2005/0002263 A1 * | 1/2005 | Iwase et al. | 365/230.03 |
| 2006/0036817 A1 * | 2/2006 | Oza et al. | 711/155 |
| 2006/0236204 A1 * | 10/2006 | Lee et al. | 714/763 |
| 2007/0106834 A1 * | 5/2007 | Murin et al. | 711/103 |
| 2007/0115743 A1 * | 5/2007 | Sartori et al. | 365/221 |

FOREIGN PATENT DOCUMENTS

| | | |
|---|---|---|
| EP | 1134662 A | 9/2001 |
| EP | 1764803 A | 3/2007 |
| WO | 2007037507 A1 | 4/2007 |
| WO | 20070037507 A | 4/2007 |

OTHER PUBLICATIONS

U.S. Appl. No. 11/873,805, filed Oct. 17, 2007, Pekny.
U.S. Appl. No. 11/873,826, filed Oct. 17, 2007, Pekny et al.
U.S. Appl. No. 11/873,833, filed Oct. 17, 2007, Pekny et al.

(Continued)

*Primary Examiner* — Jared Rutz
(74) *Attorney, Agent, or Firm* — Fletcher Yoder (57) ABSTRACT

Embodiments are provided that include operating a NAND memory device via an SPI interface. One such method includes cache loading a NAND memory device including loading data into a cache of the NAND memory device, writing data from the cache of the NAND memory device to an address of a memory array of the NAND memory device, and polling to determine the status of the data being written. Further one such method includes caching of data in a NAND memory device via an SPI interface comprising loading first data to a cache of the NAND memory device, writing the first data to a first address of a NAND memory array of the NAND memory device, polling the status of the cache, if polling indicates that the cache is ready, then loading a portion of the cache with second data, polling the status of the cache and the NAND memory device, and if polling indicates that the cache is ready and the device is ready, writing the second data to a second address of the NAND memory array of the NAND memory device.

23 Claims, 7 Drawing Sheets

OTHER PUBLICATIONS

Micron Technical Note TN-28-01 Boot Block Flash Memory Technology FT01 p. 65—Rev. 12/99.

Micron Technical Note TN-28-02 Bulk Erase to Boot Block Conversion FT02 p. 65—Rev. 12/99.

Micron Flash Memory MT28F008B3 MT28F800B3 3v Only, Dual Supply (Smart 3) Q10.fm—Rev. E 6/04 EN.

Micron Technical Note NAND Flash Security TN-2911_nand_security.fm—Rev. B 5/07 EN http://download.micron.com/pdf/technotes/nand/tn2911.pdf.

TMS 320x28xx, 28xxx DSP Serial Peripheral Interface (SPI) Reference Guide Literature No. SPRU059D Jun. 2002—Revised Nov. 2006.

Micron NAND Flash Memory MT29F4G08AAA, MT29F4G08BAA, MT29F4G08DAA, MT29F16G08FAA 4gb_nand_m4oa_1.fm—Rev. B 2/07 EN.

Open NAND Flash Interface Specification Revision 1.0 Dec. 28, 2006.

* cited by examiner

SERIAL INTERFACE NAND

BACKGROUND

1. Field of the Invention

Embodiments of the invention relate generally to the field of memory devices and more particularly, to a serial peripheral interface (SPI) to NAND memory devices.

2. Description of the Related Art

A serial peripheral interface (SPI) is a communication interface that provides a relatively simple connection between two devices. The SPI includes a 4-wire serial bus that enables a master device to communicate with one or more slave devices. Data is simultaneously transmitted and received via the SPI, making it a full-duplexed protocol. The protocol provides for low/medium bandwidth (1 megabaud) network connection amongst processors and other devices.

The SPI generally has four wires that include two control lines and two data lines. The control lines include a serial clock (SCLK) line and a chip select (CS) line. The SCLK line is driven with a digital clock signal to regulate the flow of bits between devices. The CS is driven with a signal that enables or disables the slave device that is being controlled by the master device. The data lines include a Master Output/Slave Input (MOSI) line and a Master Input/Slave Output (MISO) line. The MOSI line is used to transfer data from an output of the master device to an input of the slave device. The MISO line is used to transfer data from an output of the slave device to an input of the master device.

The SPI's simple configuration of control and data lines enables the SPI to have a relatively high board density at a low cost. In other words, the four control lines are simple to route between components and may not take up a significant amount of surface area on a printed circuit board (PCB). Accordingly, the SPI interface may be beneficial for use in applications that desire compact and simple layouts, such as computers.

Computer systems and other electrical systems generally include one or more memory devices. For example, computers often employ NOR flash memory and NAND flash memory. NOR and NAND flash each have certain advantages over the other. For example, NOR flash memory typically has slower write and erase speeds than NAND flash. Further, NAND flash memory typically has more endurance than NOR flash memory. However, NOR flash memory typically enables random access to data stored within the memory devices, whereas, NAND flash memory generally requires accessing and writing data in larger groups. For example, NAND flash memory typically includes a plurality of blocks that each includes a plurality of pages, wherein each page includes a large number of bytes of data. In operation, data is erased one block at a time, and written one page at a time.

Generally, communication between a device, such as a processor and a NAND memory device is accomplished with a parallel interfaces. In other words, a plurality of connections is made between the devices and the NAND memory device to enable a simultaneous (parallel) transfer, as opposed to a serial transfer, of data between the device and the NAND memory. Unfortunately, the additional numbers of connections may increase the complexity of the interfaces, increase the amount of surface area used on a printed circuit board, and increase the noise (crosstalk) between the lines.

Embodiments of the present invention may be directed to one or more of the problems set forth above.

DETAILED DESCRIPTION OF SPECIFIC EMBODIMENTS

Figure 1:
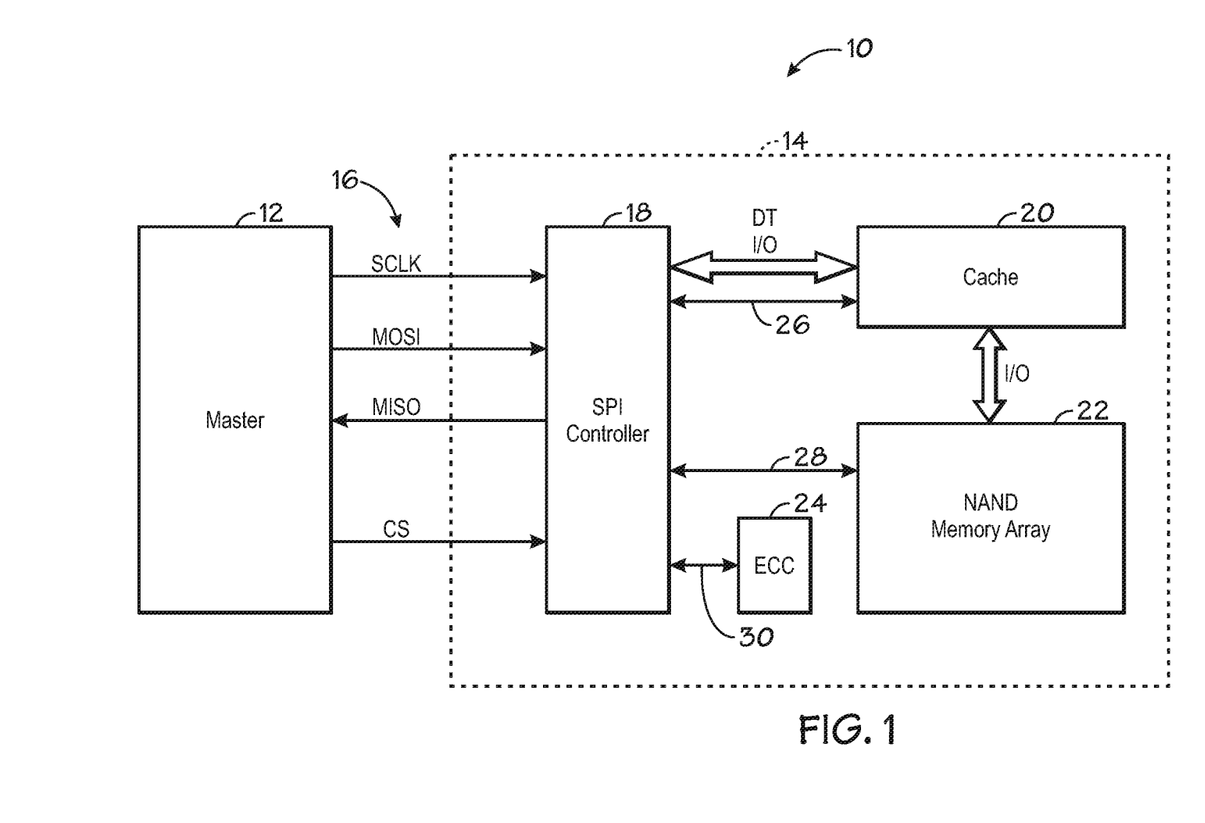
FIG. 1 is a block diagram that illustrates an embodiment of a memory device in accordance with one or more embodiments of the present invention.

FIG. 1 includes a block diagram that depicts a NAND memory system, as generally designated by reference numeral 10. The NAND memory system 10 may be any of a variety of types, such as those used in a computer, pager, cellular phone, personal organizer, control circuit, etc. The system 10 includes a master device 12 and a slave device 14. In one embodiment, the master device 12 may include a microcontroller and the slave device 14 may include a NAND memory device.

The master device 12 communicates with the slave device 14 via various transmission lines. In the illustrated embodiment, the master device 12 and the slave device 14 send and receive signals via a serial peripheral interface (SPI). In the illustrated embodiment, the SPI includes an SPI bus 16. The SPI bus 16 is a synchronous serial data link standard that operates in full duplex mode. Devices on the SPI bus 16 operate in a master/slave mode that enables the master device 12 to initiate data frames to one or more slave devices 14. The master device 12 and the slave device 14 generally include shift registers that enable them to exchange and store data values. In operation, the master device 12 and the slave device 14 can do various things with the data stored in the registers, such as save the data to memory. The SPI bus 16 includes a Master Output/Slave Input (MOSI) line, a Master Input/Slave Output (MISO) line, a Serial Clock (SCLK) line, and a Chip Select (CS) line.

The MOSI line includes a first communication line that is used to transfer data from an output of the master device 12 to an input of the slave device 14. The MISO line includes a second communication line that is used to transfer data from an output of the slave device 14 to an input of the master device 12.

The SCLK line includes a first control line that is driven with a digital clock signal to regulate the flow of bits between devices. In the illustrated embodiment, the SCLK line is driven by the master device 12. Embodiments may also include an externally provided SCLK signal that regulates the master device 12, as well as other devices in the system 10. The data on an output line may be changed on the falling edge of the signal on the SCLK line, and data at the input may be latched on the rising edge of the signal on the SCLK line, for instance. In other words, the state of the line may be changed at the falling edge and read on the rising edge of the clock signal on the SCLK line.

The CS signal includes a second control line that enables or disables the slave device 14. Enabling and disabling the slave device 14 may determine when the slave device is communicating with (e.g., being controlled by) the master device 12. In other words, the CS line can be used to enable a slave device 14 to communicate with the master device 12. The CS line is typically an active low signal. Accordingly, the master device 12 may drive the CS line low to enable the slave device 14.

In one embodiment, the system 10 may include a plurality of slave devices 14. For example, the system 10 may include a single SCLK line, a single MOSI line, and a single MISO line that are connected to each of the plurality of slave devices 14. The master device 12 may also include a plurality of SC lines that are each connected to one of the plurality of slave devices 14. In operation, the master device 12 may output to the SCLK line, the MOSI line and MISO line, and individually toggle the state of the respective CS lines to activate a particular one of the plurality of slave devices 14.

In the illustrated embodiment, the slave device (NAND memory device) 14 includes an SPI controller 18, a cache 20, a NAND memory array 22, and an ECC 24 status register. The SPI controller 18 receives and transmits data via the SPI bus 16. Data that is transmitted across the SPI bus 16 is received by inputs of the SPI controller 18. The SPI controller 18 also transmits and receives signals via data transfer input/output lines (DT I/O) and control lines 26, 28 and 30 that are internal to the NAND memory device 14. The DT I/O lines enable communication with the cache 20. The control line 26 enables the SPI controller 18 to transmit and receive control signals to and from the cache 20. The control line 28 enables the SPI controller to transmit and receive control signals to and from the NAND memory array 22. The control line 30 enables the SPI controller to transmit and receive control signals to and from the error-correcting code (ECC) status register 24.

In operation, the SPI controller 18 receives the data transmitted via the SPI bus 16, and synchronizes the flow of data (DT I/O) and control signals between other components of the NAND memory 14. For example, the SPI controller 18 receives data and commands in a serialized format via the MOSI line, and parses the incoming serialized signal for the data and the commands. The SPI controller 18 may include shift registers that provide appropriate timing of the signals transmitted and received by the SPI controller 18. Further, the SPI controller 18 may include algorithms that are run onboard to interpret incoming signals that include commands, addresses, data, and the like. The algorithms may also include routines to determine the appropriate outputs of the SPI controller 18, including address schemes, error corrections, movements of data within the NAND memory array 22, and the like. Similarly, the SPI controller 18 may include circuitry to synchronize the transmission of data from the SPI controller 18 to the master device 12 via the MISO line. In one embodiment, the SPI controller 18 transmits the data received to the cache 20, the NAND memory array 22, and/or the ECC status register 24 without a translation of the control signals and the data into a NAND format.

In operation, data (DT I/O) is transferred to or from the NAND memory array 22 byte-by-byte through the cache 20. The cache 20 acts as a data buffer for the data being transferred from the SPI controller 18 to the NAND memory array 22. Data may be written into the cache 20 and subsequently written into the NAND memory 22. Similarly, data may be read from the NAND memory array 22 into the cache 20, and subsequently transmitted from the cache 20 to the master device 12 via the SPI controller 18 and the MISO line. The cache 20 may be various sizes. For instance, the cache 20 may include 2048 bytes, 4096 bytes, 8192 bytes or a multiple thereof. The cache 20 may also be smaller sizes such, as 256 bytes or 512 bytes. It should be noted, that in certain embodiment, a data register may reside in the cache 20 or the NAND memory array 22 to provide a path for the transfer of data between the cache 20, and the NAND memory array 22. In other words, a plurality of data bits may be shifted into the data register before being written to an address of the NAND memory array 22.

The NAND memory array 22 includes a memory cell array that is divided into blocks. A block includes a fixed number of pages. The NAND memory array 22 is programmed and read in page-based operations (e.g., one page at a time) and is erased in block based operations (e.g., one block at a time). Because the NAND memory array 22 is accessed sequentially as a page, random data access of bytes may not be possible. In other words, a single byte cannot be read from the NAND memory array 22, because the read and write functions are done multiple bytes (e.g., a page of bytes) at a time.

The NAND memory array 22 may include any number and size of blocks and pages. In one embodiment, where the NAND memory device 14 has a 4 gigabyte (Gb) capacity, the NAND memory array 22 may include 2048 blocks, wherein each block includes 64 pages of 2112 bytes each. Other embodiments may include the NAND memory device 14 having 8192 blocks and an 8 Gb capacity, 16384 blocks and a 16 Gb capacity, and the like.

NAND memory cells have a limited number of write/erase cycles (e.g. 100,000 program/erase cycles). To prolong the life of the NAND memory device 14, "wear leveling" can be applied to spread data across various physical locations of the memory. Wear leveling generally includes writing data to the various locations to ensure an even use of the cells to prevent certain portions of the NAND memory array 22 from prematurely failing. Wear leveling may include initially writing the data to one of the various locations in the NAND memory array 22, or may include moving the data from one physical location (e.g., an address) within the NAND memory array 22 and writing that same data to another physical location in the NAND memory array 22. The SPI controller 18 may manage the wear leveling routines used to determine where the data is written to. For example, algorithms, and/or circuitry on the SPI controller 18 may monitor the memory usage and determine an appropriate address to write data within the NAND memory array 22.

The ECC status register 24 is used to detect and/or correct bit errors that can occur during normal operation, as well as bit errors that occur due to charge loss/gain that develop over time. For example, the ECC status register 24 may include circuitry used to detect and correct errors when reading data back from the NAND memory array 22. The ECC status register 24 may supplement algorithms employed on the SPI controller 18. The ECC status register 24 may also include a group of sub-registers. These sub-registers may include an ECC enable/disable register that enables optional ECC for the memory device data, an ECC type register that stores the total number of errors discovered, an ECC location register that stores the location of any uncorrectable errors, an ECC NAND memory result register that stores information regarding the result of any error correction process on the NAND memory array 22, or an ECC cache memory result register that stores information regarding the result of any error correction process on the cache 20. The ECC status register 24 may include all of the previous ECC sub-registers or any combination of the preceding sub-registers. Although the ECC status register 24 is shown to be external to the SPI controller 18, the ECC status register 24 may be integral to the SPI controller 18.

Figure 2:
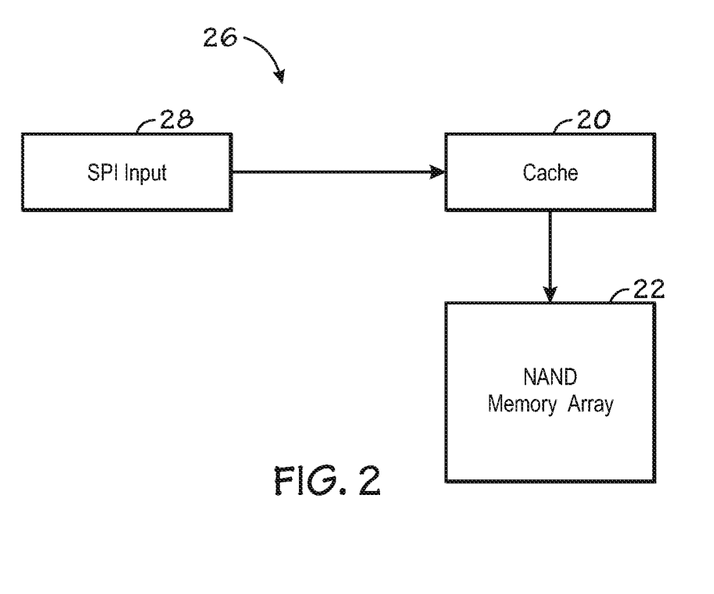
FIG. 2 is a block diagram that illustrates a method of cache loading a NAND memory array in accordance with one or more embodiments of the present invention.

Turning now to FIG. 2, a block diagram of a process 26 of cache loading data into the NAND memory array 22 via an SPI interface, is illustrated. The process 26 generally includes loading SPI input 28 to the cache 20 and the NAND memory array 22. The SPI input 28 includes serialized data that is transmitted across the SPI bus 16 and passed through the SPI controller 18. Once the cache 20 is filled and/or the desired amount of data is loaded into the cache 20, the data is written (executed) to the NAND memory array 22.

Figure 3:
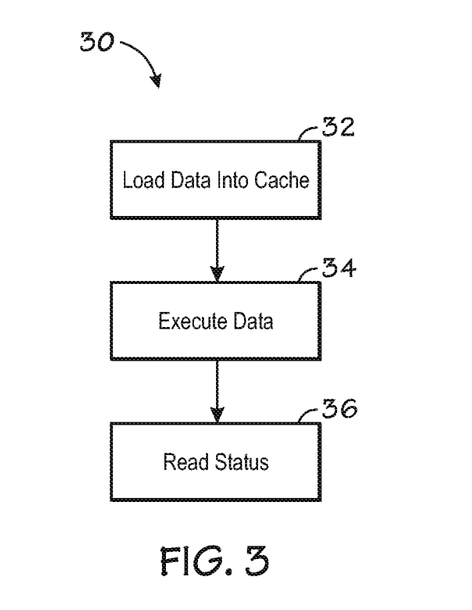
FIG. 3 is a flowchart that further illustrates a method of cache loading a NAND memory array in accordance with one or more embodiments of the present invention.

FIG. 3 is a flowchart that further illustrates a method 30 of cache loading data into the NAND memory array 22 via an SPI interface. Generally, the method 30 includes loading data into the cache 32, executing the data 34 into the NAND memory array 22, and reading the status of the execution 36.

At block 32, the method 30 includes loading data into the cache. Loading data into the cache (block 32) may include providing a serialized input signal via the SPI bus 16, wherein the serialized signal is indicative of commands, addresses, data, and the like. For example, a loading data sequence may include providing a program load command, followed by a column address, and a series of data. In an embodiment, the program load sequence includes a 1 byte command, followed by the starting column address for loading the cache (2 bytes), followed by the data to load into the cache.

Figure 4:
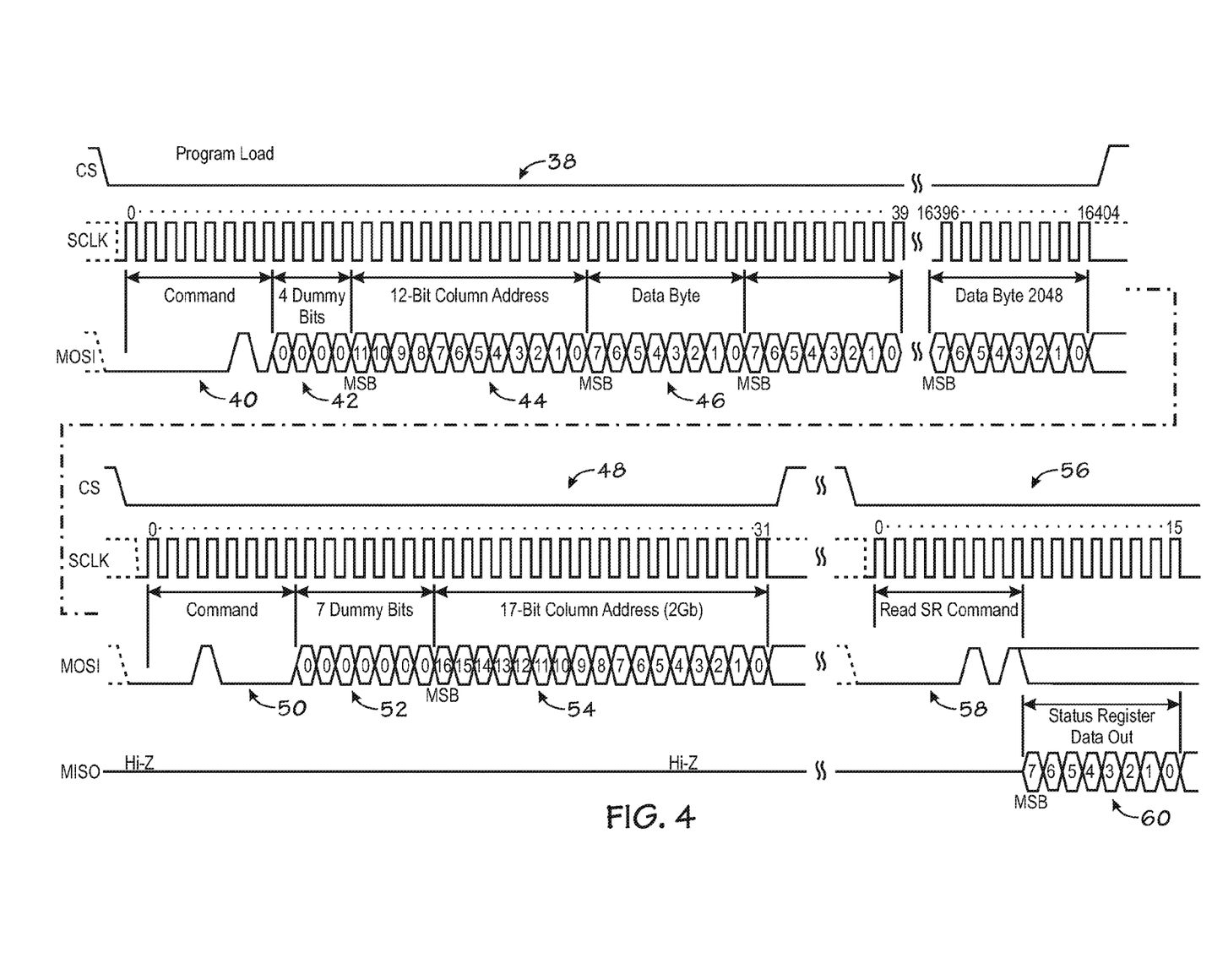
FIG. 4 is a timing diagram that illustrates SPI signals in accordance with one or more embodiments of the present invention.

A timing diagram of an embodiment of the program load sequence is illustrated in FIG. 4. In the illustrated embodiment, the CS line is driven low during the period of communication 38. In other words, the CS line is driven low while the master device 12 is sending or receiving serialized data to and from the slave device 14. During the first eight clock cycles, a 1 byte command 40 is transmitted. In one embodiment the SPI controller 18 may initiate a sequence to initialize all of the bits of the cache 20 to 1's or 0's based on the command 40 and in anticipation of incoming data. In the illustrated embodiment, the 1 byte command 40 is immediately followed by four dummy bits 42 transmitted during the next four clock cycles. The dummy bits 42 may or may not be used to align the command and/or 12 bit column address 44 to a byte format. In other words, where it is desired that the serialized load command and/or column address 44 be transmitted in increments of eight bits, the dummy bits may be used to align the incoming serialized data to an increment of eight. For example, the four dummy bits 42 are employed to provide sixteen bits, a multiple of eight, when combined with a 12 bit column address. The dummy bits 42 may be included at various locations in the serialized data, or may not be included at all. Following the dummy bits 42, the twelve bit column address 44 is transmitted during the next twelve clock cycles. As discussed previously, the column address 44 may indicate where in the cache 20 to store subsequent data. The column address 44 may vary based on the size of the cache 20. A first data byte 46 in most significant bit (MSB) format is transmitted during the next eight clock cycles. In the illustrated embodiment, the serialized signal includes 2048 bytes. The total number of data bytes 46 may be varied based on the page size or the size of the cache 20. For example, in one embodiment, the page size may includes an additional 64 bytes for ECC (spare area), and the serialized signal includes 3012 bytes (2048 bytes+64 bytes). Following the last data byte, the CS line is driven high to relinquish control of the slave device 14. During the period where the CS line is high, the SPI controller may run various algorithms, map the addresses to a given location, execute the error correcting code, and the like.

Returning now to FIG. 3, at block 34, the method 30 includes executing data. Executing data (block 34) may include providing a serialized input signal via the SPI bus 16, wherein the serialized signal is indicative of commands, addresses, data, and the like. For example, a program execute sequence may include providing a program execute command followed by a row address. In an embodiment, the program execute sequence includes a 1 byte command, followed by the block and page address (3 bytes) of the NAND memory array 22 to load the data into.

A timing diagram of an embodiment of the program execute sequence is also illustrated in FIG. 4. As illustrated in the timing diagram, the program execute sequence may be executed in series with the program load sequence, discussed previously. In the illustrated embodiment, the CS line is driven low during the period of communication 48. In other words, the CS line is driven low while the master device 12 is sending or receiving serialized data to and from the slave device 14. During the first eight clock cycles, a 1 byte command 50 is transmitted. In the illustrated embodiment, the 1 byte command 50 is immediately followed by seven dummy bits 52 transmitted during the next seven clock cycles. The seven dummy bits 52 are employed to provide twenty-four bits, a multiple of eight, when combined with a seventeen bit row address 54. Following the dummy bits 52, the seventeen bit row address 54 is transmitted during the next seventeen clock cycles. As discussed previously, the row address 54 may indicate the block and page address where the data is to be stored in the NAND memory array 22. Following the last data bit in the row address 54, the CS line is driven high to relinquish control of the slave device 14. During this period, the SPI controller 18 may run various algorithms, map the addresses to a given location, execute code, and the like. Further, the cache 20 may employ error correcting code and/or move the data into the NAND memory array 22.

Returning again to FIG. 3, at block 36, the method 30 includes reading a status. Reading a status may include the master 12 receiving a serialized signal that is indicative of the outcome of the execute sequence (block 34). In other words, the master device 12 may issue a command via the SPI bus 16 to query whether or not an algorithm associated with the execute command 50 has completed and/or was successful. For example, a read status sequence may include providing a read status register command on the MOSI line followed by a status register data output provided on the MISO line. In an embodiment, a read status sequence includes a 1 byte command, followed by a status register data output (1 byte).

A timing diagram of an embodiment of the read status sequence is also illustrated in FIG. 4. As illustrated in the timing diagram, the read status sequence may be executed in series with the program load sequence and the program execute sequence, discussed previously. In the illustrated embodiment, the CS line is driven low during the period of communication 56. In other words, the CS line is driven low during while the master device 12 is sending and receiving serialized data to and from the slave device 14. During the first eight clock cycles, a 1 byte command 58 is transmitted. In the illustrated embodiment, the 1 byte command 58 is immediately followed by a status register data output 60 transmitted on the MISO line during the next eight clock cycles. As discussed previously, the status register data output 60 may indicate whether or not an algorithm associated with the execute command 50 has completed and/or was successful. Accordingly, the master device 12 may receive and interpret the status register data output 60 to determine if the operation was successful and/or completed, and base subsequent commands and actions taken by the master device 12 on the determination. It should be noted that ECC may be executed at any time while the CS line is driven high (disabled).

Figure 5:
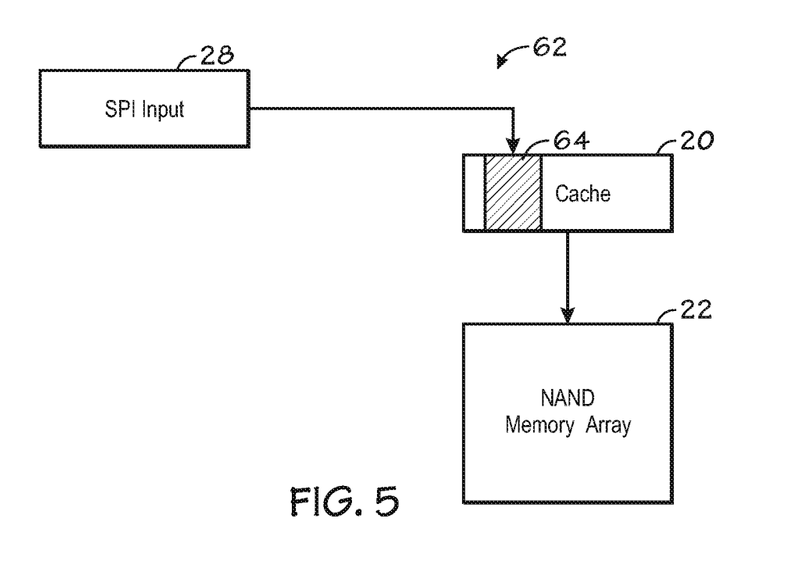
FIG. 5 is a block diagram that illustrates a method of loading random data into the cache of a NAND memory device in accordance with one or more embodiments of the present invention.

Turning now to FIG. 5, a block diagram of a process 62 that enables a random data byte to be loaded, via an SPI interface, into a selected column address 64 of the cache 20, is illustrated. The process 62 generally includes loading SPI input 28 to a specific address 64 of the cache 20 without initializing all of the bits in the cache 20. In other words, the process 62 enables modifying a single byte or more of the cache 20 at the address 64 without changing the value of the other bytes stored in the cache 20. The SPI input 28 may include serialized data that is transmitted across the SPI bus 16 and passed through the SPI controller 18. Similar to the embodiments previously discussed, once the specific data is loaded into the cache 20, the data is written (executed) to the NAND memory array 22.

Figure 6:
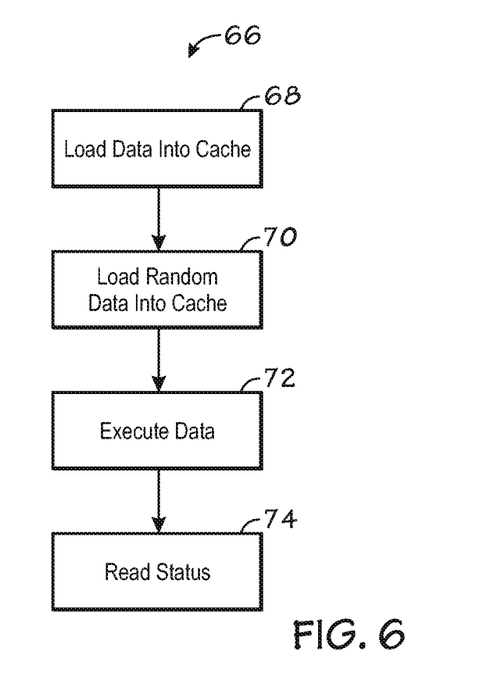
FIG. 6 is a flowchart that further illustrates a method of loading random data into the cache of a NAND memory device in accordance with one or more embodiments of the present invention.

FIG. 6 is a flowchart further illustrating a method 66 of loading random data into the cache 20 and executing the data from the cache to the NAND memory array 22 via an SPI interface. Generally, the method 66 includes loading data into the cache (block 68), loading a random data input into the cache (block 70), executing the data (block 72) into the NAND memory array 22, and reading the status of the execution (block 74).

At block 68, the method 66 includes loading data into the cache. Similar to the previously discussed embodiments, loading data into the cache may include providing a serialized input signal via the SPI bus 16, wherein the serialized signal is indicative of commands, addresses, data, and the like. For example, loading data may include providing a program load command followed by a column address, and a series of data. In an embodiment, the program load sequence may include a 1 byte command, followed by the starting column address for loading the cache (2 bytes), followed by the data to load into the cache. The timing diagram of an embodiment of the program load sequence is discussed previously with regard to FIG. 4.

At block 70, the method 66 includes loading random data into the cache. Loading random data into the cache 20 may include loading data to a specific address of the cache 20. The data may be one byte or more. For example, the number of bytes may be limited only by the size of the cache 20 (e.g., 2048 bytes, 4096 bytes, 8192 bytes, or more) Unlike the program load command, loading random data into the cache 20 does not initialize each of the bits in the cache 20, but instead merely overwrites the data at the target address 64. In an embodiment, a program load with random data input sequence includes a 1 byte program load with random data input command, followed by the starting column address for loading the cache (2 bytes), followed by the data to load into the cache 20.

Figure 7:
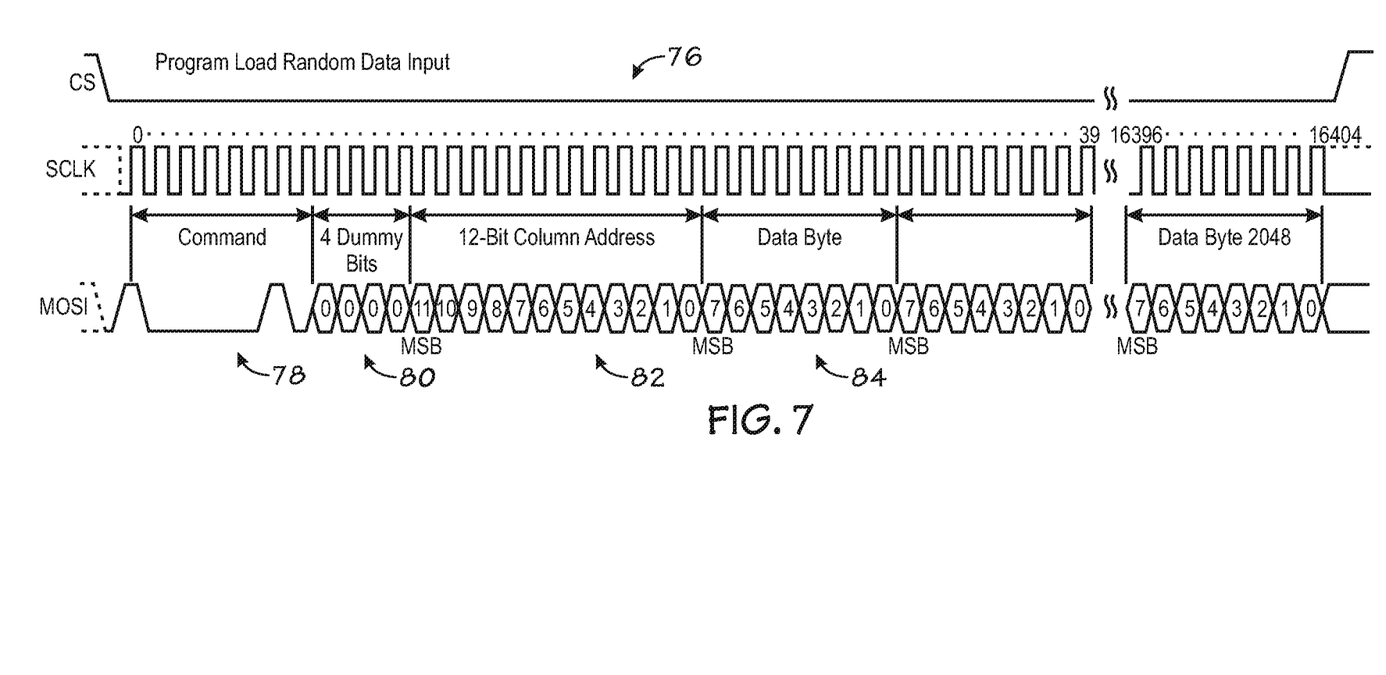
FIG. 7 is a timing diagram that illustrates SPI signals associated with loading random data into the cache of a NAND in accordance with one or more embodiments of the present invention.

A timing diagram of an embodiment of a program load with a random data input sequence is illustrated in FIG. 7. Similar to the embodiment of the program load sequence discussed with regard to FIG. 4, in the illustrated embodiment, the CS line is driven low during the period of communication 76. During the first eight clock cycles, a 1 byte command 78 (e.g., program load with random data input command) is transmitted. In one embodiment, the SPI controller 18 does not initiate a sequence to initialize all of the bits of the cache 20 to 1's or 0's based on the command and in anticipation of incoming data. In the illustrated embodiment, the 1 byte command 78 is immediately followed by four dummy bits 80 transmitted during the next four clock cycles. The dummy bits 80 may or may not be used to align the command and/or column address 82 to a byte format. The dummy bits 80 may be included at various locations in the serialized data, or may not be included at all. Following the dummy bits 80, the twelve bit column address 84 is transmitted during the next twelve clock cycles. As discussed previously, the column address 84 may indicate where in the cache 20 to store subsequent data. The column address 84 may vary based on the size of the cache 20 and desired location to write data into the cache 20. A first data byte 84 is transmitted during the next eight clock cycles. In the illustrated embodiment, the serialized signal includes 2048 bytes. The total number of data bytes 84 may be varied based on the size of the cache 20. Following the last data byte, the CS line is driven high to relinquish control of the slave device 14. During the period where the CS line is high, the SPI controller 18 may run various algorithms, map the addresses to a given location, execute the error correcting code, and the like.

Returning now to FIG. 6, at block 72, the method 66 includes executing data. Executing data may include providing a serialized input signal via the SPI bus 16, wherein the serialized signal is indicative of commands, addresses, data, and the like. For example, an executing data sequence may include providing the execute command followed by a row address. In an embodiment, a program execute sequence includes a 1 byte command, followed by the block and page address (3 bytes) of the NAND memory array 22 to load the data into. The timing diagram of an embodiment of the program execute sequence has been discussed above with regard to FIG. 4.

Returning again to FIG. 6, at block 74, the method 66 includes reading a status. Reading a status may include the master 12 receiving a serialized signal that is indicative of the outcome of the execute sequence (block 72). In other words, the master device 12 may issue a command via the SPI bus 16 to query whether or not an algorithm associated with the execute command has completed and/or was successful. For example, a reading status sequence may include providing a command on the MOSI line followed by a status register data output provided on the MISO line. In an embodiment, a read status command includes a 1 byte command, followed by a status register data output (1 byte). The timing diagram of an embodiment of the program read sequence has been discussed previously with regard to FIG. 4.

Figure 8:
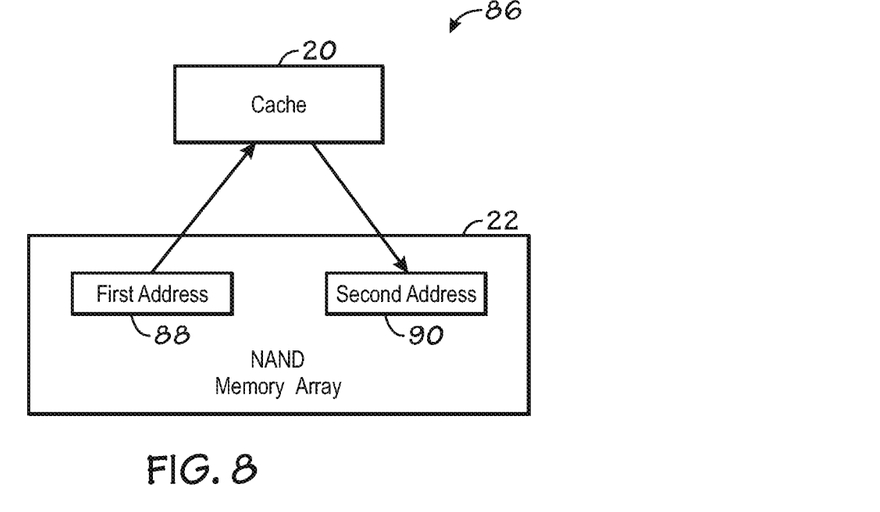
FIG. 8 is a block diagram that illustrates a method of moving data within a NAND memory device in accordance with one or more embodiments of the present invention.

Turning now to FIG. 8, a block diagram illustrates a process 86 that includes moving data within a NAND memory array 22 (e.g., an internal data move), via an SPI interface. In other words, data stored in the NAND memory array 22 may be moved to a second location per an SPI sequence/command. The process generally includes loading data from a first address 88 in the NAND memory array 22 into the cache 20. The data now loaded into the cache 20 is subsequently executed to a second address 90 in the NAND memory array 22. Such a technique may be particularly useful in a wear leveling routine that includes moving data from one physical location to another physical location within the NAND memory array 22. Further the technique may be useful for moving data from a first location in the NAND memory array 22 having bad cells to a second location in the NAND memory array 22 having good cells.

Figure 9:
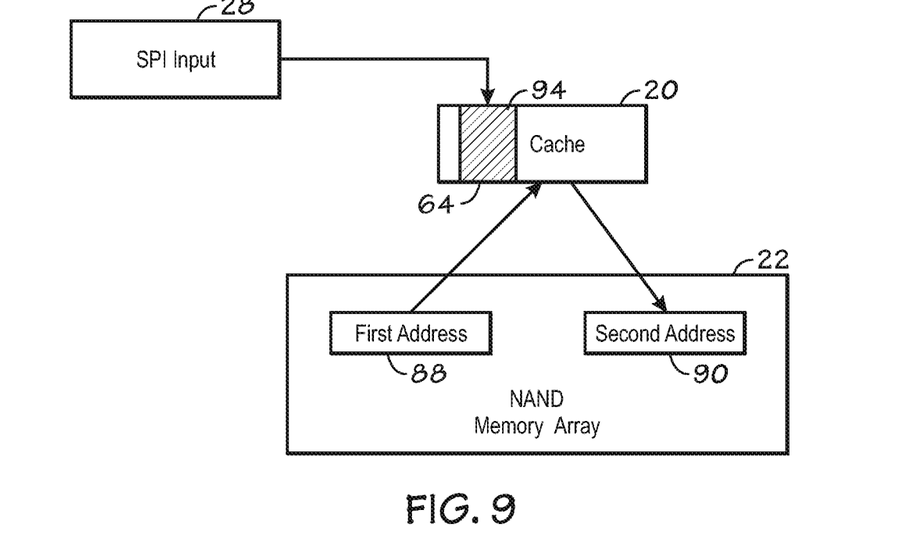
FIG. 9 is block diagram that illustrates a method of moving and modifying data within a NAND memory device in accordance with one or more embodiments of the present invention.

Turning now to FIG. 9, a block diagram illustrates a process 92 that includes moving and modifying data within a NAND memory array 22 (e.g., a modify internal data move), via an SPI interface. In other words, data stored in the NAND memory array 22 may be moved to a second location per an SPI command/sequence, and the data may be modified during the move. The process generally includes loading data from the first address 88 in the NAND memory array 22 into the cache 20. The data now loaded into the cache 20 (e.g., the original data) is subsequently modified. For example, a single byte or more of the cache 20 may be replaced with new data 94. The new data 94 may include data received from an SPI input 28 as serialized data, for instance. The cache data including the new data 94 (e.g., the modified cache data) may then be executed to the second address 90 in the NAND memory array 22. Similar to the technique discussed with regard to FIG. 8, such a technique may be particularly useful in a wear leveling routine, and for moving and modifying data from a first location in the NAND memory array 22 to a second location in the NAND memory array 22. It should be noted that error correction code may be executed at any time while the CS line is driven high (disabled). Accordingly, where the data is loaded into the cache 20, modified, and then executed back into the NAND memory array 22, ECC may be executed a first time after the data is loaded into the cache 20, the data modified, and prior to executing the data into the NAND memory array 22 the ECC executed a second time.

Figure 10:
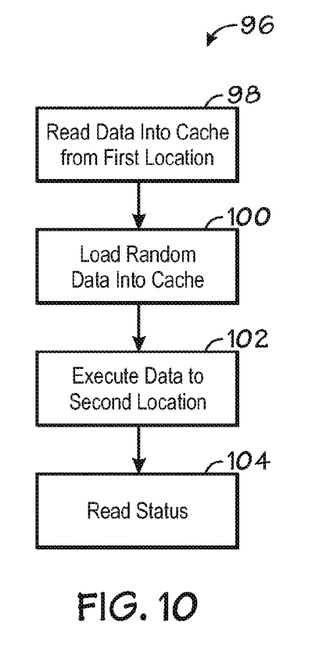
FIG. 10 is a flowchart that further illustrates a method of moving and modifying data within a NAND memory device in accordance with one or more embodiments of the present invention.

FIG. 10 is a flowchart further illustrating a method 96 of an internal data move and/or a modify internal data move that is commanded via an SPI interface. Generally, the method 96 includes reading the data into the cache from a first location 98 into the NAND memory array 22, loading a random data input into the cache 100 (if the method includes a modify internal data move), executing the data to a second location 102 into the NAND memory array 22, and reading the status of the execution 104.

At block 98, the method 96 includes reading the data into the cache from a first location. Similar to the previously discussed embodiments, reading data into the cache 20 may include providing a serialized input signal via the SPI bus 16, wherein the serialized signal is indicative of commands, addresses, data, and the like. For example, reading data into the cache may include providing a page read sequence that includes a page read command followed by a block and page address for the data to be retrieved from the NAND memory array 22. The block and page address may correspond to the first address 88, for instance. The data at the specified block and address is transferred to the cache 20.

The method 96 may or may not include the step of loading random data into the cache 100. For example, if an embodiment of the method includes modifying data while it resides in the cache 20, the step of loading random data into the cache 100 may be performed. Otherwise, an embodiment of the method 96 may not include the step of loading random data into the cache 100. Loading random data into the cache 100 includes loading data to a specific address of the cache 20. The random data may include one byte or more. For example, the number of bytes may be limited only by the size of the cache 20 (e.g., 2048 bytes, 4096 bytes, 8192 bytes or more). Unlike the program load command, a program load random data input command does not initialize each of the bits in the cache 20, but instead merely overwrites the data at the target address 64. In an embodiment, a program load with random data input sequence includes a 1 byte command, followed by the starting column address for loading the cache (2 bytes), and followed by the data to load into the cache 20. The timing diagram of an embodiment of the program load random data input sequence has been discussed previously with regard to FIG. 7.

At block 102 of FIG. 10, the method 96 also includes executing data. Similar to the previously discussed embodiment, executing data may include providing a serialized input signal via the SPI bus 16, wherein the serialized signal is indicative of commands, addresses, data, and the like. For example, an executing data sequence may include providing a program execute command followed by a row address. In an embodiment, the program execute sequence includes a 1 byte command, followed by the block and page address (3 bytes) of the NAND memory array 22 to load the data into. The timing diagram of an embodiment of the program execute command has been discussed previously with regard to FIG. 4.

At block 104, the method 96 includes reading a status. Reading a status may include the master 12 receiving a serialized signal that is indicative of the outcome of the execute command (block 102). In other words, the master device 12 may issue a command via the SPI bus 16 to query whether or not an algorithm associated with the execute command has completed and/or was successful. For example, a read status sequence may include providing the read status command on the MOSI line followed by a status register data output provided on the MISO line. In one embodiment, the read status sequence includes a 1 byte read statue command, followed by a status register data output (1 byte). The timing diagram of an embodiment of the program read command is discussed above with regard to FIG. 4.

Accordingly, the method 96 may be employed to read data into the cache 20 from the first address 88 of the NAND memory array 22 and move the data to the second address 90 in the NAND memory array 22 (see FIG. 8). In an alternate embodiment, the method 96 may be employed to read data into the cache 20 from the first address 88 of the NAND memory array 22, modify at least a portion of the data stored in the cache 20, and move the data to the second address 90 in the NAND memory array 22 (see FIG. 9).

Figure 11:
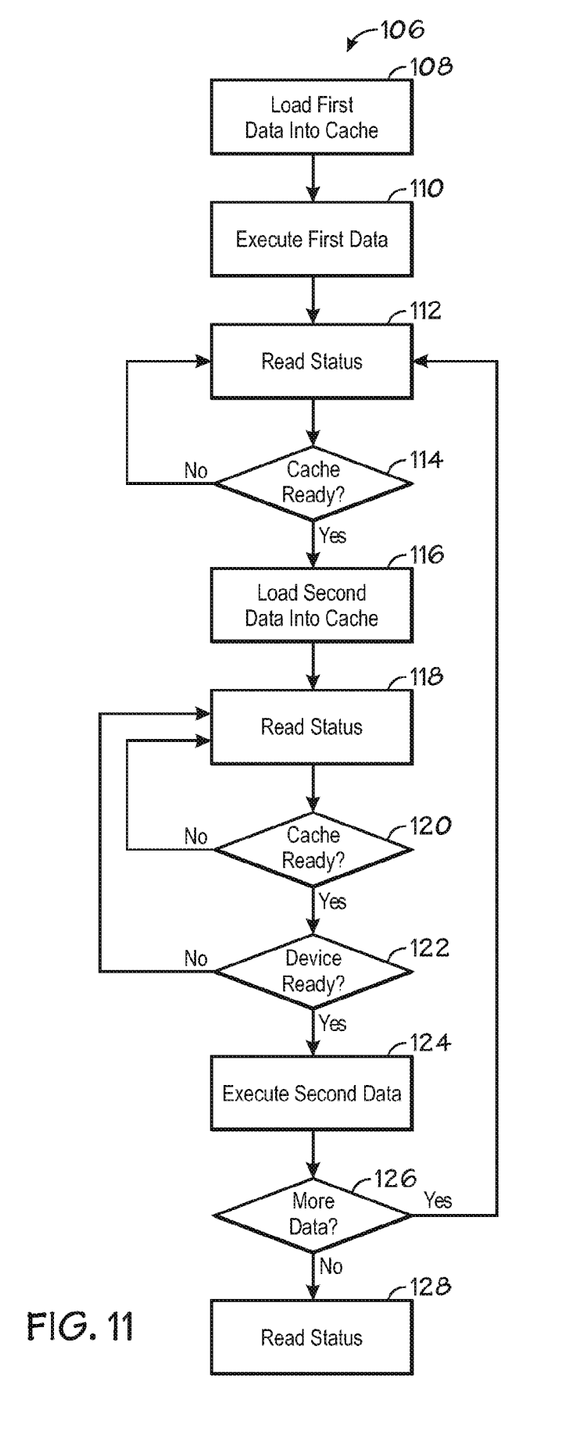
FIG. 11 is a flowchart that illustrates a method of simultaneously cache loading and executing data within a NAND memory device in accordance with one or more embodiments of the present invention.

Turning now to FIG. 11, a flowchart of a method 106 for simultaneously loading and unloading the cache 20 (e.g., a cache programming feature), is illustrated. The method 106 enables the cache 20 to be freed up so that while a page program (e.g., execution) from the cache 20 or the data register is occurring, new data can be loaded into the cache 20. This provides a faster data through-put when compared to the page programming not using the cache programming feature. For example, for a 2 KB page, a typical page program time for SPI NAND may be about 200-300 microseconds (us), and a cache load time is about 410 us using a 25 ns period SCLK signal. In a first method of cache loading, cache loading and the page program may be done in series. In other words, once the cache loading is complete, the page is programmed, and the next cycle of cache loading does not begin until after the page is programmed. This may give an approximate total time of 610-710 us to load the cache and program a page. Using the cache program feature and method 106, the data through-put is typically limited by only the cache load time. In other words, page programming and cache loading can be done in parallel such that the page is programmed during the 410 us the cache is loading. The cache 20 can be loaded with a second set of data while the page program is being completed and, thus, the total time to load the cache and program a page is approximately 410 us.

In a system 10 that is used to employ the method 106, two additional status bits may be employed. A first status bit may be employed to provide an indication that the cache is busy or ready. A second status bit may be employed to provide an indication of whether or not the device (e.g., the data register and/or the NAND memory array 22) is busy or ready. For example, a status register byte that is generated in response to the read status command may include a first bit and/or a second bit that indicates the status of the cache and/or the data register.

In operation, the system 10 may load data into the cache 20, begin a page program (e.g., execution) of data to the NAND memory array 22, poll the status of the cache 20 and the data register/NAND memory array 22 until the cache 20 is ready, load new data into the cache, poll the status of the cache 20 and the data register/NAND memory array 22 until the cache 20 and the data register/NAND memory array 22 are ready, and, then, execute the new data into the NAND memory array 22.

In FIG. 11, the first step includes loading first data into the cache 20, as illustrated at block 108. Similar to the previous discussions, loading data into the cache (block 108) generally includes issuing a program load sequence (e.g., a program load command, a column address, and data from the master device 12 to the slave device 14 via the SPI bus 16).

The first data is then executed, as illustrated at block 110. The execution of data begins a sequence of loading data from the cache 20 to the data register and the NAND memory array 22, as discussed with regard to the timing diagram of the execute command in FIG. 4. Similar to the previous discussions, executing data from the cache 20 to the NAND memory array 22 generally includes issuing a program execute sequence (e.g., a program execute command, a row address, from the master device 12 to the slave device 14 via the SPI bus 16).

After issuing the program execute sequence (block 110), the method 106 includes reading the status, as illustrated at block 112. Similar to the previous discussions, reading the status generally includes the slave device 14 outputting the status register byte on the MISO line, and the master device 12 reading the status register byte(s) to determine the status of the execute sequence or other commands. In the method 106, reading the status (block 112) is used to determine whether or not the cache is ready, as illustrated at block 114. If the cache status bit in the status register byte indicates that the cache 20 is not ready, the master 12 continues to poll the status register.

If, or once, the status register read at the read status step (block 112) indicates that the cache is ready (block 114), the method proceeds to loading second (new) data into the cache, as illustrated at block 118. Loading second data into the cache (block 116) may be accomplished in parallel (e.g., simultaneous) with the execution of at least a portion of the first data into the data register/NAND memory array 22. In other words, if the cache 20 becomes ready while the execution is taking place, the second data may begin to load into the cache 20 while data is still being executed into the NAND memory array 22.

The method 106, then, includes reading the status, as illustrated at block 118. Similar to the process at block 112, reading the status 118 generally includes the slave device 14 outputting the status register byte on the MISO line, and the master device 12 reading the status register byte(s) to determine the status of the execute sequence or other commands. In the method 106, reading the status (block 112) is used to determine whether or not the cache is ready, as illustrated at block 120, and whether or not the device (e.g., the data register/NAND memory array 22) is ready, as illustrated at block 122. If the cache status bit and the device status bit in the status register byte indicate that the cache 20 and the data register/NAND memory array 22 is not ready, the master 12 continues to poll the status register byte.

If, or once, the status register byte read at the read status step (block 118) indicates that the cache 20 is ready (block 120) and the data register/NAND memory array 22 is ready (block 122), the method 106 proceeds to executing second (new) data into the cache, as illustrated at block 124.

In the illustrated embodiment of the method 106, if there is additional data to be loaded into the cache 20, the method 106 may determine that there is more data to be loaded (e.g., a third set of data), and return to the read status at block 112 to repeat the above discussed method. In other words, the method 106 repeats polling the status register and loading the third set of data into the cache 20 when the cache 20 is ready, and, subsequently, executes the third set of data when the cache 20 and the data register/NAND memory array are both ready. However, if there is no additional set of data to be loaded, the method 106 may proceed to read the status, as illustrated at block 128. Based on the status, the method 106 may terminate, repeat, or initiate the master device 12 to proceed with other functions and commands. It should be noted that various steps in the method 106 may be completed in varying order, skipped or repeated to provide similar functionality. For example, the check for more data at block 126 may be performed after the read status at block 128.

It should be noted that one advantage of cache loading and executing a sequence of data with the program execute command, as discussed previously, includes the flexibility of being able to specify a specific address of each program execute command in the sequence. For example, providing a specific address in each of the execute commands enables each program execute to specify where to store each set of data. In contrast methods that do not include an address in each command may merely place the data in the next available address (e.g., sequential page+1 addressing). Stated another way, the program execute command enables flexibility in specifying where each set of data in a sequence is addressed as opposed to a method that merely assigns each set of data in a sequence to the next sequential address.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of cache loading a NAND memory device via an SPI interface comprising:
   loading data into a specified address of a cache of the NAND memory device, wherein the specified address of the cache of the NAND memory device is specified by a first program sequence sent to the SPI interface from a host external to the NAND memory device;
   writing data from the specified address of the cache of the NAND memory device to a specified address of a memory array of the NAND memory device, wherein the specified address of the memory array of the NAND memory device is specified by a second program sequence sent to the SPI interface from the host; and
   polling to determine the status of the data being written.

2. The method of claim 1, wherein loading data into the address of the cache of the NAND memory device comprises issuing the first program sequence, wherein the first program sequence comprises a program load sequence to the SPI interface to load data into the cache.

3. The method of claim 2, wherein the program load sequence comprises a 1 byte command, a 2 byte column address corresponding to the address of the cache, and at least 1 data byte.

4. The method of claim 1, wherein writing data from the cache of the NAND memory device to an address of the memory array of the NAND memory device comprises issuing the second program sequence, wherein the second program sequence comprises a program execute sequence to the SPI interface to write data to the address of the NAND memory device.

5. The method of claim 1, comprising executing error correction code when a chip select signal is driven to a disabled state.

6. The method of claim 1, wherein polling to determine the status of the data being written comprises issuing a read status command to the SPI interface to poll the status of the data written to the address of the NAND memory device.

7. A method of inputting data to a NAND memory device comprising:
   issuing a program load random data input sequence from a host to an SPI controller to load new data into one of a plurality of column addresses of a cache of a NAND memory device without initializing data stored at nearby column addresses of the cache, wherein the program load random data input sequence specifies the one of the plurality of column addresses of the cache; and
   issuing a program execute sequence from the host to the SPI controller to load data stored in the cache at or near the one of the plurality of column addresses of the cache to a specified address of a NAND memory array of the NAND memory device, wherein the program execute sequence specifies the specified address of the NAND memory array, wherein the data stored in the cache at or near the one of the plurality of column addresses of the cache comprises the new data.

8. The method of claim 7, wherein the program load random data input sequence comprises a 1 byte command, a 12 bit column address, and at least 1 data byte.

9. The method of claim 7, wherein the program load random data input sequence comprises a dummy bit to align the address to a byte format.

10. A method of moving data within a NAND memory device comprising:
    communicating via an SPI bus to an SPI controller from a host, wherein communicating comprises generating a first sequence to read data from a first address of a NAND memory array of the NAND memory device into a specified cache address of the NAND memory device, wherein the first sequence specifies the specified cache address, and generating a second sequence to write the data from the specified cache address of the NAND memory device to a second address of the NAND memory array of the NAND memory device, wherein the second sequence specifies the second address of the NAND memory array.

11. The method of claim 10, wherein the first sequence comprises a page read command and the second sequence comprises a program execute command.

12. The method of claim 10, comprising polling a status of the data written to the NAND memory array of the NAND memory device.

13. The method of claim 10, comprising generating a read status command to poll a status of the data written to the second address of the NAND memory array of the NAND memory device.

14. The method of claim 10, wherein moving the data within the NAND memory device is employed based on a wear-leveling algorithm.

15. A method of modifying internal data in a NAND memory device comprising:
    issuing a page read sequence from a host to an SPI controller to read data from a first address of a memory array of the NAND memory device and load the data into a specified cache address of the NAND memory device, wherein the page read sequence specifies the specified cache address of the NAND memory device;
    issuing a program load random data input sequence from the host to the SPI controller to load new data into one of a plurality of column addresses associated with the specified cache address of the NAND memory device, wherein the program load random data input sequence specifies the one of the plurality of column addresses; and
    issuing a program execute sequence from the host to the SPI controller to write data from the specified cache address of the NAND memory device to a second address of the memory array of the NAND memory device, wherein the program execute sequence specifies the second address of the memory array of the NAND memory device.

16. The method of claim 15, comprising executing error correction code before and after issuing the program load random data input sequence.

17. The method if claim 15, wherein the program load random data input sequence only modifies the data overwritten by the new data.

18. The method of claim 15, comprising moving the data between the first address and second address of the memory array of the NAND memory device based on a wear leveling algorithm.

19. A method of caching data in a NAND memory device via an SPI interface comprising:
    loading first data to a specified cache address of the NAND memory device by issuing a first program load sequence that specifies the specified cache address to an SPI controller from a host;
    writing the first data from the specified cache address to a first address of a NAND memory array of the NAND memory device by issuing a first program execute sequence that specifies the first address of the NAND memory device to the SPI controller from the host;
    polling a status of the cache by issuing a first read status sequence to the SPI controller;
    if polling indicates that the cache is ready, then loading a portion of the specified cache address with second data by issuing a second program load sequence that specifies at least the portion of the specified cache address to the SPI controller from the host;
    polling the status of the cache and the NAND memory device by issuing a second read status sequence to the SPI controller; and
    if polling indicates that the cache is ready and the device is ready, writing the second data from the specified cache address to a second address of the NAND memory array of the NAND memory device by issuing a second program execute sequence that specifies the second address of the NAND memory device to the SPI controller from the host.

20. The method of claim 19, wherein the method is repeated for additional sets of data to be written to the memory array of the NAND memory device.

21. The method of claim 19, wherein polling the status of the cache of the NAND memory device comprises the SPI controller outputting a status register byte that comprises a cache status bit.

22. The method of claim 19, wherein polling the status of the NAND memory device comprises the SPI controller outputting a status register byte that comprises a device status bit.

23. The method of claim 19, comprising polling the status of the cache and the NAND memory device to determine if writing the second data to a second address of the NAND memory array of the NAND memory device has completed.

* * * * *

UNITED STATES PATENT AND TRADEMARK OFFICE
CERTIFICATE OF CORRECTION

PATENT NO. : 8,429,329 B2
APPLICATION NO. : 11/873816
DATED : April 23, 2013
INVENTOR(S) : Theodore T. Pekny et al.

Page 1 of 1

It is certified that error appears in the above-identified patent and that said Letters Patent is hereby corrected as shown below:

In the Claims:

In column 14, line 33, in Claim 17, delete "if claim" and insert -- of claim --, therefor.

Signed and Sealed this
Twenty-fifth Day of June, 2013

Teresa Stanek Rea
*Acting Director of the United States Patent and Trademark Office*